United States Patent [19]

Fuhr et al.

[11] Patent Number: 4,988,748

[45] Date of Patent: Jan. 29, 1991

[54] FLAME-RESISTANT THERMOPLASTIC POLYCARBONATE MOLDING COMPOUNDS

[75] Inventors: Karl Fuhr, Krefeld; Friedemann Müller, Neuss; Karl-Heinz Ott; Hans-Dieter Block, both of Leverkusen; Bernd Urbanneck, Moenchengladbach; Werner Ballas, Dormagen, all of Fed. Rep. of Germany

[73] Assignee: Bayer Aktiengesellschaft, Leverkusen, Fed. Rep. of Germany

[21] Appl. No.: 377,078

[22] Filed: Jul. 10, 1989

[30] Foreign Application Priority Data

Jul. 19, 1988 [DE]  Fed. Rep. of Germany ....... 3824356

[51] Int. Cl.$^5$ .......................... C08K 3/26; C08K 3/34; C08K 5/09; C08K 5/52
[52] U.S. Cl. ..................... 524/141; 525/146; 525/147; 525/148
[58] Field of Search ................ 524/141; 525/146, 147, 525/148

[56] References Cited

U.S. PATENT DOCUMENTS

| | | | |
|---|---|---|---|
| 4,463,130 | 7/1984 | Serini et al. | 525/132 |
| 4,481,338 | 11/1984 | Serini et al. | 525/146 |
| 4,683,255 | 7/1987 | Sugio et al. | 524/151 |
| 4,751,260 | 6/1988 | Kress et al. | 525/146 |

Primary Examiner—Paul R. Michl
Assistant Examiner—Christopher P. Rogers
Attorney, Agent, or Firm—Connolly and Hutz

[57] ABSTRACT

The invention relates to thermoplastic polycarbonate molding compounds containing polycarbonates, copolymers, phosphorus compounds, tetrafluoroethylene polymers and, optionally, graft polymers and also further additives and other thermoplastics and also stabilizers, pigments, flow aids, mold release agents, antistatic agents and/or other flameproffing agents, characterized in that they contain as phosphorus compounds those corresponding to formula (I)

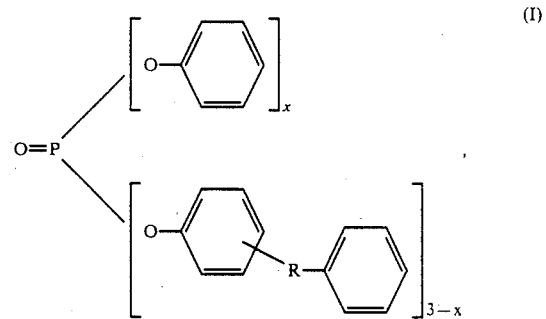

and to a process for the production of the polycarbonate molding compounds.

10 Claims, No Drawings

FLAME-RESISTANT THERMOPLASTIC POLYCARBONATE MOLDING COMPOUNDS

This invention relates to thermoplastic molding compounds containing (A) 40 to 90 parts by weight and preferably 50 to 70 parts by weight of a thermoplastic aromatic polycarbonate, (B) 10 to 50 parts by weight and preferably 15 to 35 parts by weight of a thermoplastic copolymer of 50 to 95% by weight styrene, α-methyl styrene, nucleus-alkylated styrene, halostyrene or mixtures thereof and 5 to 50% by weight acrylonitrile, methacrylonitrile, alkyl acrylate, alkyl methacrylate, maleic anhydride, N-substituted maleic imide, vinyl acetate or mixtures thereof, (C) 0 to 25 parts by weight and preferably 0 to 20 parts by weight of a graft polymer produced from (C.1) 5 to 90 parts by weight and preferably 30 to 80 parts by weight of a mixture of:

(C.1.1) 50 to 95% by weight styrene, α-methyl styrene, halostyrene, nucleus-alkylated styrene, methyl methacrylate or mixtures thereof and (C.1.2) 5 to 50% by weight (meth)acrylonitrile, methyl methacrylate, maleic anhydride, N-substituted maleic imide or mixtures thereof on (C.2) 10 to 95 parts by weight and preferably 20 to 70 parts by weight of a rubber having a glass temperature $T_G$ of $\leq 10°$ C., for example of polybutadiene, alkyl acrylate, EPDM (ethylene-propylene-diene-monomer) or silicone rubbers, (D) 1 to 25 parts by weight and preferably 2 to 20 parts by weight of a phosphorus compound, based on 100 parts by weight of the mixture of (A)+(B) and, optionally, (C), (E) 0.05 to 5.0 parts by weight and preferably 0.1 to 1.0 part by weight, based on 100 parts by weight (A)+(B) and, optionally, (C) of a tetrafluoroethylene polymer having mean particle sizes of 0.05 to 20 μm and a density of 1.2 to 1.9 g/cm³, a coagulated mixture of emulsions of the tetrafluoroethylene polymers (E) with emulsions of graft polymers (C), in which the ratio by weight of graft polymer (C) to tetrafluoroethylene polymer (E) is from 95:5 to 60:40 and the content of co-precipitate of (C) and (E) is between 0.1 and 20.0 parts by weight, based on 100 parts by weight (A), (B) and optionally (C), preferably being used, which are characterized in that they contain as the phosphorus compounds (D) those corresponding to formula (I)

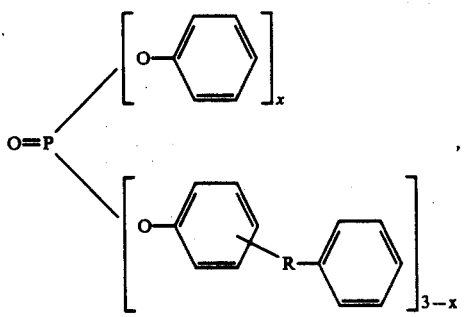

in which R is a direct bond, a —CH$_2$—,

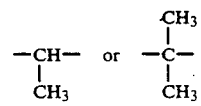

group and x=0, 1 or 2 and the aromatic parts may also be alkyl-substituted.

Polycarbonate molding compounds containing phosphate esters corresponding to formula (II)

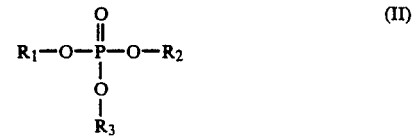

in which
R$_1$, R$_2$ and R$_3$ may be the same or different and represent C$_1$–C$_{20}$ hydrocarbon radicals, at least two of the substituents R$_1$, R$_2$ and R$_3$ being substituted or unsubstituted aryl groups, are known (cf. DE-OS 3 429 481 (Le A 23 063) and DE-OS 3 430 234 (Le A 22 925)). However, the compounds of formula (I) are not present in these known polycarbonate molding compounds.

Polycarbonate molding compounds containing phosphorus compounds corresponding to formula (III)

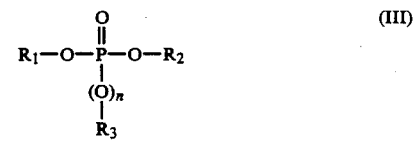

in which
R$_1$, R$_2$ and R$_3$ independently of one another may represent an optionally halogenated C$_1$–C$_8$ alkyl or an optionally halogenated C$_6$–C$_{20}$ aryl radical and n=0 or 1, are also known (cf. EP-OS 0 174 493 (Le A 23 043-EP), DE-OS 3 444 869 (Le A 23 527), DE-OS 3 444 868 (Le A 23 502), DE-OS 3 516 807 (LE A 23 790), DE-OS 3 521 888 (Le A 23 877), DE-OS 3 523 316 (Le A 23 927), DE-OS 3 523 314 (Le A 23 940), DE-OS 3 545 609 (Le A 24 039), DE-OS 3 615 768 (Le A 24 500), DE-OS 3 617 511 (Le A 24 501), DE-OS 3 628 904 (Le A 24 683) and DE-OS 3 629 546 (Le A 24 695)). The compounds of formula (I) are not mentioned in these publications either.

The main disadvantage of these molding compounds containing phosphates corresponding to formulae (II) and (III) is that the phosphoric acid esters described in these literature references are partially volatile under production and processing conditions. In general, increasing the molecular weight of the phosphates by lengthening the alkyl chains of aromatic compounds hardly reduces volatility, but does lead to a reduction in the effectiveness of the phosphates for flame-resistant formulations because the phosphorus content decreases. Accordingly, to restore the flame-resistant properties, relatively large amounts of phosphorus additives have to be used, undesirably reducing the Vicat softening point for example.

It is also known that polycarbonate molding compounds can be flameproofed with polyphosphates (cf. U.S. Pat. Nos. 4,463,130 (Le A 21 835) and 4,481,338 (Le A 21 841)).

However, molding compounds such as these are attended by the disadvantage that, because they contain polymeric phosphates, they do not achieve the high degree of flow required.

It has surprisingly been found that, where the phosphoric acid esters of formula (I) according to the invention, for example of benzyl phenol, 4-phenyl phenol, 1-phenylethyl phenol and 1-methyl-1-phenylethyl phenol, are used, high levels of impact strength, surface quality and flame resistance are achieved while heat resistance (measured as Vicat (B) is improved and the tendency which the phosphoric acid esters have to evaporate during processing of the molding compounds and also their migration during storage, particularly in the presence of heat, are significantly suppressed.

One group of compounds corresponding to formula (I), mainly phosphates of 4-phenyl phenol, has been described as suitable for the flameproofing of PPO resin compounds (cf. U.S. Pat. No. 4,683,255) which may optionally contain polystyrene resins.

The polycarbonates of component (A) suitable for use in accordance with the invention may be both homopolycarbonates and also copolycarbonates of diphenols corresponding to formula (IV)

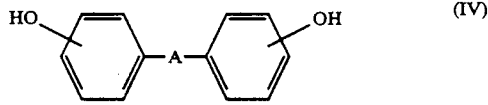
(IV)

In addition, the polycarbonates of component (A) may also be, in particular, copolycarbonates of diphenols corresponding to formulae (IV) and (IVa):

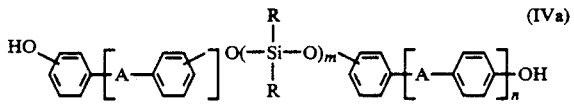
(IVa)

in which
A is a single bond, $C_1-C_5$ alkylene, a $C_2-C_5$ alkylidene, a $C_5-C_6$ cycloalkylidene, —O—, —S— or —$SO_2$—, the aromatic parts may be substituted by methyl groups or halogen atoms, n=1 or 0, the R's may be the same or different and represent a linear $C_1-C_{20}$ alkyl, branched $C_3-C_{20}$ alkyl or $C_6-C_{20}$ aryl, preferably $CH_3$, and n is a number of from 5 to 100, preferably from 20 to 80, the quantity by weight of diphenols corresponding to formula (IVa) in the copolycarbonates being gauged in such a way that the content of diorgano-siloxy units (V)

(V)

in polycarbonate (A) is between 1 and 25% by weight and preferably between 2.5 and 25% by weight.

The polycarbonates of component (A) may be both linear and branched; they may contain aromatically bound halogen, preferably bromine and/or chlorine, although they may also be free from aromatically bound halogen, i.e. halogen-free.

The polycarbonates of component (A) may be used both individually and in admixture. In cases where component (A) is a mixture of siloxane-containing polycarbonates and siloxane-free polycarbonates, the siloxane-containing polycarbonates may also contain more than 25% by weight diorganosiloxy units providing the content of polycarbonate mixture is again between 1 and 25% by weight through mixing with the siloxane-free polycarbonates.

The diphenols corresponding to formula (IV) are either known from the literature or may be obtained by methods known from the literature; hydroxyaryloxy-terminated polydiorganosiloxanes corresponding to formula (IVa) are also known (see for example U.S. Pat. No. 3,419,634) or may be obtained by methods known from the literature.

The production of the polycarbonates of component (A) suitable for use in accordance with the invention is known from the literature and may be carried out, for example, with phosgene by the interfacial process or with phosgene by the homogeneous-phase process (or pyridine process), the particular molecular weight to be established being obtained in known manner by a corresponding quantity of known chain terminators (for polydiorganosiloxane-containing polycarbonates, see for example DE-OS 3 334 782).

Suitable chain terminators are, for example, phenol or p-tert.-butyl phenol and also long-chain alkyl phenols, such as 4-(1,3-tetramethylbutyl)-phenol according to DE-OS 2 842 005 or monoalkyl phenols or dialkyl phenols containing in all 8 to 20 C atoms in the alkyl substituents according to DE-OS 3 506 472, such as for example p-nonyl phenol, 2,5-di-tert.-butyl phenol, p-tert.-octyl phenol, p-dodecyl phenol, 2-(3,5-dimethylheptyl)-phenol and 4-(3,5-dimethylheptyl)-phenol. The quantity of chain terminators to be used is generally between 0.5 and 10 mol-%, based on the sum total of diphenols (IV) and (IVa) used.

The polycarbonates of component (A) suitable for use in accordance with the invention may be branched in known manner, preferably through the incorporation of 0.5 to 2.0 mol-%, based on the sum of diphenols used, of trifunctional or more than trifunctional compounds, for example those containing three or more than three phenolic OH groups.

They have weight average molecular weights ($\overline{M}_2$, as measured for example by ultracentrifugation or scattered light measurement) in the range from 10,000 to 200,000 and preferably in the range from 20,000 to 80,000.

Suitable diphenols of formula (IV) are, for example, hydroquinone, resorcinol, 4,4,'-dihydroxydiphenyl, 2,2-bis(4-hydroxyphenyl)-propane, 2,4-bis-(4-hydroxyphenyl)-2-methyl butane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, or 1,1-bis(4-hydroxyphenyl)-cyclohexane.

Preferred diphenols corresponding to formula (IV) are 2,2-bis-(4-hydroxyphenyl)-propane and 1,1-bis-(4-hydroxyphenyl)-cyclohexane. Mixtures of diphenols may also be used.

Suitable diphenols corresponding to formula (IVa) are those in which R is methyl, ethyl, propyl, n-butyl, tert.-butyl and phenyl. Mixtures of diphenols corresponding to formula (IVa) may also be used.

Preferred diphenols of formula (IVa) correspond to formula (IVb)

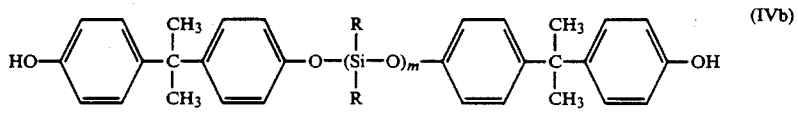

(IVb)

in which
the R's are the same and are as defined above, i.e. represent methyl, etc. and phenyl, and n is again an integer of 5 to 100 and preferably of 20 to 80.

Preferred polydiorganosiloxane polycarbonate block copolymers are copolycarbonates of the diphenols corresponding to formula (IV) with diphenols corresponding to formula (IVb).

Thermoplastic copolymers of component (B) suitable for use in accordance with the invention are resin-like, thermoplastic and rubber-free. Particularly preferred polymers (B) are those of styrene, α-methyl styrene, nucleus-alkylated styrene, halostyrene or mixtures thereof with acrylonitrile, methacrylonitrile, alkyl acrylate, alkyl methacrylate, maleic anhydride, N-substituted maleic imide, vinyl acetate or mixtures thereof. Nucleus-substituted styrenes are understood to be nucleus-alkylated styrenes such as, for example, p-methyl styrene.

Particularly preferred ratios by weight in the thermoplastic polymer (B) are, for example, 60 to 80% by weight styrene, α-methyl styrene, nucleus-substituted styrene, halostyrene or mixtures thereof and 20 to 40% by weight acrylonitrile.

The polymers of component (B) are known and may be prepared by radical polymerization, more particularly by emulsion, suspension, solution or bulk polymerization. The polymers of component (B) preferably have molecular weights $\bar{M}w$ (weight average, as determined by light scattering or sedimentation) of from 15,000 to 200,000.

Rubbers suitable for the production of the graft polymers of component (C) are, in particular, polybutadienes, polychloroprenes, polyisoprenes, styrene-butadiene copolymer rubbers, acrylonitrile-butadiene copolymer rubbers having gel contents (as measured at 20° C.) of more than 30% by weight, alkyl acrylate rubbers, EPDM (ethylene-propylene-diene-monomer) rubbers and silicone rubbers.

Suitable butadiene-styrene copolymer rubbers may contain up to 30% by weight, based on the weight of the rubber, of a lower alkyl ester of acrylic or methacrylic acid (for example methyl methacrylate, ethyl acrylate, methyl acrylate).

Suitable alkyl acrylate rubbers are those based on $C_1$-$C_8$ alkyl acrylates, particularly ethyl, butyl and ethylhexyl acrylates. These alkyl acrylate rubbers may optionally contain up to 30% by weight, based on the weight of rubber of such monomers as vinyl acetate, acrylonitrile, styrene, nucleus-alkylated styrene, halostyrene, methyl methacrylate and/or vinyl ethers in copolymerized form. These alkyl acrylate rubbers may also contain relatively small quantities, preferably up to 5% by weight, based on the weight of the rubber, of crosslinking, ethylenically unsaturated monomers. Crosslinking agents of the type in question are, for example, alkylene diol di(meth)acrylates, polyester di(meth)acrylate, divinyl benzene, trivinyl benzene, triallyl cyanurate, allyl (meth)acrylate, butadiene or isoprene. Alkyl acrylates of this type are known. Acrylate rubbers as the graft base may also be products which contain a crosslinked diene rubber of one or more conjugated dienes, such as polybutadiene, or a copolymer of a conjugated diene with an ethylenically unsaturated monomer, such as styrene and/or acrylonitrile, as core.

The silicone rubbers suitable for use in accordance with the invention contain at least partly crosslinked particulate silicone rubbers containing largely chemically incorporated groups corresponding to the general formulae (a) $R_2SiO_{2/2}$, $RSiO_{3/2}$, $R_2R^3SiO_{1/2}$, $SiO_{4/2}$ and optionally groups corresponding to the following formula
(b) $R^1CH=CH$—$(R^2)$— optionally in combination with SH groups, where
R = a monofunctional, saturated hydrocarbon radical, more particularly —$CH_3$, —$C_6H_5$, optionally substituted by —SH, halogen, $C_1$-$C_6$ alkoxyl,
$R^1$ = H, $C_1$-$C_6$ alkyl, more particularly H, $CH_3$,
$R^2$ = a single bond, $C_1$-$C_4$ alkylene, more especially —$CH_2$—, —$C_2H_4$— and
$R^3$ = R or OH,
in dispersed form.

The quantities of the individual siloxane units are gauged in such a way that from 0 to 0.5 mol units $R_2R^3SiO_{1/2}$, 0 to 10 mol units $RSiO_{3/2}$ and 0 to 3 mol units $SiO_{4/2}$ are present per 100 mol units $R_2SiO_{2/2}$.

In preferred silicone rubbers, at least 80% of all the substituents R are $CH_3$ groups.

In the case of the group $R_2R^3SiO_{1/2}$, one of the three substituents R may also be a hydroxyl group. The particularly preferred terminal group is the dimethyl hydroxy siloxy unit.

The silicone rubbers contain the groups (b) in quantities of from 2 to 10 mol-%, based on all the substituents R.

Preferred rubbers for the production of the graft polymers (C) are diene, alkyl acrylate and silicone rubber.

The rubbers are present in the graft polymers (C) in the form of at least partially crosslinked particles having a mean particle size of from 0.1 to 3.0 μm and more particularly from 0.2 to 0.6 μm. They are at least partially crosslinked, i.e. they have gel contents above 20% by weight, preferably above 50% by weight and more preferably in the range from 73 to 98% by weight.

The graft polymers (C) are prepared by radical graft copolymerization of the monomer mixtures of (C.1.1) and (C.1.2) defined at the beginning in the presence of the rubbers (C.2) to be grafted and are all known. Preferred production processes for the graft polymers (C) are emulsion, solution, bulk or suspension polymerization. Particularly preferred graft polymers (C) are the so-called ABS polymers.

The phosphorus compounds of component (D) suitable for use in accordance with the invention may generally be obtained by known methods (cf. for example Ullmann, Enzyklopädie der technischen Chemie, Vol. 18, pages 301 et seq, 1979; Houben-Weyl, Methoden der Organischen Chemie, Vol. 12/1, page 43; Beilstein, Vol. 6, page 177).

The aromatic parts of the phosphorus compounds suitable for use in accordance with the invention may be alkyl-substituted; the carbon chain may contain up to about 4 carbon atoms.

Phosphorus compounds of component (D), formula (I), suitable for use in accordance with the invention are, for example, phosphoric acid bis-phenyl-(4-phenyl-phenyl)-ester, phosphoric acid phenyl-bis-(4-phenyl-phenyl)-ester, phosphoric acid tris-(4-phenylphenyl)-ester, phosphoric acid bis-phenyl-(benzylphenyl)-ester, phosphoric acid phenyl-bis-(benzylphenyl)-ester, phosphoric acid tris-(benzyl-phenyl)-ester, phosphoric acid phenyl-bis-[(1-phenylethyl)-phenyl]-ester, phosphoric acid phenyl-bis-[(1-methyl-1-phenylethyl)-phenyl]-ester and phosphoric acid phenyl-bis-[4-(1-phenylethyl)-2,6-dimethylphenyl]-ester.

The phosphoric acid phenyl-bis-(4-phenylphenyl)-ester, the phosphoric acid phenyl-bis-[(1-phenylethyl)-phenyl]-ester and the phosphoric acid phenyl-bis-(benzylphenyl)-ester are particularly preferred. The phosphoric acid esters according to the invention may also be used in admixture with one another and in admixture with polyphosphoric acid esters of novolaks (U.S. Pat. No. 4,105,825).

The tetrafluoroethylene polymers of component (E) suitable for use in accordance with the invention are polymers having fluorine contents of 65 to 76% by weight and preferably of 70 to 76% by weight. Examples include polytetrafluoroethylene, tetrafluoroethylene-hexafluoropropylene copolymers or tetrafluoroethylene copolymers containing small quantities of fluorine-free copolymerizable, ethylenically unsaturated monomers. Polymers such as these are known. They may be produced by known processes, for example by polymerization of tetrafluoroethylene in aqueous medium with a catalyst forming free radicals, for example sodium, potassium or ammonium peroxydisulfate under pressures of 7 to 71 kg/cm$^2$ and at temperatures in the range from 0° to 200° C. and preferably at temperatures in the range from 20° to 100° C. (for further particulars, see for example U.S. Pat. No. 2,393,967).

The polytetrafluoroethylenes suitable for use in accordance with the invention have mean particle sizes of from 0.05 to 20 μm and preferably from 0.08 to 10 μm and a density of from 1.2 to 1.9 g/cm$^3$.

The addition of tetrafluoroethylene polymers above all reduces or completely prevents dripping of the molten molding compound in the event of a fire.

If, now, the molding compounds according to the invention are produced, for example, by melt compounding in kneaders or extruders from granulates or powders of components (A) to (D) and a polytetrafluoroethylene powder of typical particle size and density, moldings of high flame resistance are obtained, although moldings produced therefrom occasionally have a defective surface, for example as a result of microcracks or streaks.

This is reliably avoided by using the very finely divided and, in addition, unsintered tetrafluoroethylene polymers in the form of a coagulated mixture of emulsions of the tetrafluoroethylene polymers (E) with emulsions of the graft polymers (C).

To prepare a corresponding mixture, an aqueous emulsion (latex) of a graft polymer (C) having mean latex particle sizes of from 0.1 to 2.0 μm and more especially from 0.2 to 0.6 μm is first mixed with a finely divided emulsion of a tetrafluoroethylene polymer in water having mean particle sizes of 0.05 to 20 μm and more especially from 0.08 to 10 μm. Suitable tetrafluoroethylene polymer emulsions normally have solids contents of from 30 to 70% by weight and more especially from 50 to 60% by weight. The emulsions of the graft polymers (C) to be used have solids contents of from 25 to 60% by weight and more preferably from 30 to 45% by weight.

In the emulsion mixture, the ratio by weight of graft polymer (C) to the tetrafluoroethylene polymer (E) is from 95:5 to 60:40. The emulsion is then coagulated in known manner, for example by spray drying, freeze drying or coagulation by addition of inorganic or organic salts, acids, bases or organic water-miscible solvents, such as alcohols, ketones, preferably at temperatures in the range from 20° to 150° C. and more preferably at temperatures in the range from 50° to 100° C. If necessary, the coagulate may be dried at 50° to 200° C. and preferably at 70° to 100° C.

Suitable tetrafluoroethylene polymer emulsions are commercial products and are available, for example, from the DuPont company as Teflon ® 30N.

Since the graft polymers (C) to be used in accordance with the invention are used by premixing of their emulsions with emulsions of components (E), component (C) is best prepared by emulsion polymerization.

The ratio of polytetrafluoroethylene (E) to graft polymer (C) should be selected so that the total content of (E) in the mixture of (A)+(B)+(C) is between 0.1 and 3.0 parts by weight.

The thermoplastic molding compounds according to the invention may contain other thermoplastics, such as polyalkylene carboxylic acid esters, polysulfones, polyether sulfones, polyphenylene sulfides and other additives suitable for components (A), (B) and, optionally, (C), such as stabilizers, pigments, flow aids, mold release agents, antistatic agents and/or other flameproofing agents in typical quantities.

Accordingly, the present invention also relates to polycarbonate molding compounds containing components (A), (B), (D), (E) and, optionally, (C), thermoplastic polyalkylene carboxylic acid esters, thermoplastic polysulfones, thermoplastic polyether sulfones, thermoplastic polyphenylene sulfides, stabilizers, pigments, flow aids, mold release agents, antistatic agents and/or other flameproofing agents.

The thermoplastic molding compounds according to the invention containing components (A), (B), (D), (E) and, optionally, (C), thermoplastic polyalkylene carboxylic acid esters, thermoplastic polysulfones, thermoplastic polyether sulfones, thermoplastic polyphenylene sulfides, stabilizers, pigments, flow aids, mold release agents, antistatic agents and/or other flameproofing agents are prepared by mixing the particular constituents mentioned above in known manner and melt-compounding or melt-extruding the resulting mixture at temperatures of 200° to 330° C. in standard units, such as internal kneaders, single-screw or twin-screw extruders, or by mixing solutions of the particular constituents mentioned above in suitable organic solvents, for example in chlorobenzene, and concentrating the solution mixtures in standard units, for example in evaporation extruders.

The individual constituents may be mixed in known manner both successively and simultaneously either at around 20° C. (room temperature) or even at a higher temperature.

Accordingly, the present invention also relates to a process for the production of thermoplastic polycarbonate molding compounds containing components (A), (B), (D), (E) and, optionally, (C), polyalkylene carboxylic acid esters, polysulfones, polyether sulfones, polyphenylene sulfides, stabilizers, pigments, flow aids, mold release agents, antistatic agents and/or other flameproofing agents, characterized in that the particular constituents mentioned above are mixed in known manner and the resulting mixture is melt-compounded or melt-extruded in standard units at temperatures in the range from 200° to 330° C. or solutions of the particular constituents mentioned above in suitable organic solvents are mixed and the solution mixtures are concentrated by evaporation in standard units.

The molding compounds according to the invention may be used for the production of moldings of all kinds. In particular, moldings may be produced by injection molding. Examples of moldings which may be produced from the molding compounds according to the invention include housing components of all kinds (for example for domestic appliances, such as juice presses, coffee machines, mixers) or cover panels for the building industry and parts for the automotive industry. They are also used in the electrical engineering field because they have very good electrical properties.

Another form of processing is the production of moldings by the thermoforming of extruded sheets or films.

In the context of the invention, particle size always means the average particle diameter $d_{50}$, as determined by ultracentrifugation in accordance with W. Scholtan et al. Kolloid-Z u. Z. Polymere 250 (1972), 782-796.

EXAMPLE 1

Production of phosphoric acid phenyl-bis-(benzylphenyl)-ester

In a 4 liter flask equipped with a capillary, a Vigreux column with descending condenser and a thermometer and heated by a mushroom heating hood, 652.6 g triphenyl phosphate (2 mol), 737.0 g benzyl phenol (4 mol, isomer mixture) and 9.5 g anhydrous magnesium chloride (0.1 mol) are heated to 150° C. The pressure is then slowly reduced to 300 mbar and the temperature increased to 200° C. A stream of nitrogen entering through the capillary mixes the contents of the flask. After about 1 hour, the pressure is further reduced to 40 mbar at around 200° C. and most of the phenol eliminated is distilled off over a period of about 3 hours. Thereafter, the reaction mixture is heated at a temperature increasing to around 240° C. and at a pressure falling to 5 mbar over a further period of about 3 hours.

387.3 g of a crystallized product having an OH value of 578 are obtained as distillate. It contains 375.5 g phenol (4 mol phenol: 376.5 g).

The residue in the flask is taken up in methylene chloride and washed repeatedly with water. The methylene chloride solution is then dried and concentrated. The resinous residue comprises 895.4 g which corresponds to a yield of 88.6%. The OH value is 0 and the phosphorus content 6.0% (theoretical 6.1%). The product is present predominantly as phosphoric acid phenyl-bis-(benzylphenyl)-ester.

Instead of benzylphenyl, it is also possible for example to use 4-phenyl phenol, 1-phenylethyl phenol and(1-methyl-1- phenylethyl)-phenol. Instead of benzylphenol it is also possible for example to use phenyl phenol (isomer mixture), 1-phenylethyl phenol (isomer mixture) and (1-methyl-1-phenylethyl)-phenol (isomer mixture).

Dynamic TGA measurements (heating rate 10° C./minute) showed that, at 290° C., the total volatile quantity of the above phosphate according to the invention comprises approximately 5% by weight as compared with triphenyl phosphate with a weight loss of 100%.

EXAMPLE 2

Preparation of phosphoric acid bis-phenyl-(benzylphenyl)-ester and phosphoric acid tris-(benzylphenyl)-ester If 2 mol or 6 mol rather than 4 mol benzylphenol are used as in Example 1, the phosphate obtained predominantly has the structure of phosphoric acid bis-phenyl-(benzyl-phenyl)-ester and phosphoric acid tris-(benzylphenyl)-ester.

EXAMPLE 3

Materials used

I. Aromatic polycarbonate of 100% by weight bisphenol A, relative viscosity 1.284, as measured in methylene chloride at 25° C. (0.5% by weight solution).

II. Thermoplastic polymer of styrene and acrylonitrile; acrylonitrile content 29% by weight and average molecular weight 60,000.

III. ABS graft polymer of 50% by weight of a styrene/acrylonitrile mixture (ratio 72:28) on 50% by weight of a particulate polybutadiene having a mean particle diameter ($d_{50}$) of 0.4 μm, obtained by emulsion polymerization.

IV. 10.0% by weight polytetrafluoroethylene-containing polymer according to III prepared by mixing the ABS graft polymer as a latex and the polytetrafluoroethylene as a dispersion, coagulating the mixture and working up the coagulate as a co-precipitate.

V. Pentaerythritol tetrastearate

VI. Triphenylphosphate

VII. Phosphoric acid bis-phenyl-(benzylphenyl)-ester

VIII. Phosphoric acid tris-(benzylphenyl)-ester

IX. Phosphoric acid phenyl-bis-(benzylphenyl)-ester

X. Phosphoric acid phenyl-bis-(4-phenylphenyl)-ester

XI. Phosphoric acid phenyl-bis-[(1-phenylethyl)-phenyl]-ester

XII. Phosphoric acid phenyl-bis-[(1-methyl-1-phenylethyl)-phenyl]-ester

XIII. Reaction products of a Novolak (of p-kresol) and of triphenol phosphate according to U.S. Pat. No. 4,105,825.

Production and testing of the molding compounds

Constituents I.-V. and one of the constituents VI. to XII. are mixed in the quantities (parts by weight) shown in Table 1 at 230°-240° C. in a Banbury internal kneader (Pomini-Farrel) of the BR (1.2 l) or OOC (3 l) type and processed to granulate.

TABLE 1

| | Component | | | | | | | | | | | |
|---|---|---|---|---|---|---|---|---|---|---|---|---|
| | I | II | III | IV | V | VI | VII | VIII | IX | X | XI | XII |
| Comparison 3.0 | 60.0 | 14.0 | 5.0 | 5.0 | 1.0 | 15.0 | | | | | | |
| Example 3.1 | 60.0 | 14.0 | 5.0 | 5.0 | 1.0 | | 15.0 | | | | | |
| Example 3.2 | 60.0 | 14.0 | 5.0 | 5.0 | 1.0 | | | 15.0 | | | | |

TABLE 1-continued

|  | Component | | | | | | | | | | | |
| --- | --- | --- | --- | --- | --- | --- | --- | --- | --- | --- | --- | --- |
|  | I | II | III | IV | V | VI | VII | VIII | IX | X | XI | XII |
| Example 3.3 | 60.0 | 14.0 | 5.0 | 5.0 | 1.0 | | | | 15.0 | | | |
| Example 3.4 | 65.0 | 20.0 | | 3.0 | | | | | 12.0 | | | |
| Example 3.5 | 60.0 | 19.5 | | 5.0 | 0.5 | | | | | 15.0 | | |
| Example 3.6 | 65.0 | 18.0 | | 5.0 | | | | | | 12.0 | | |
| Example 3.7 | 60.0 | 14.0 | 5.0 | 5.0 | 1.0 | | | | | | 15.0 | |
| Example 3.8 | 60.0 | 14.0 | 5.0 | 5.0 | 1.0 | | | | | | | 15.0 |

The molding compounds are injection molded at 260° C. (unit: Werner & Pfleiderer DKS 275 screw, clamping force 275 MP, screw diameter 56 mm, L:D=23:1) to form test specimens which were subjected to the following tests:

Impact strength according to DIN 43 543 ($a_n$)
Notched impact strength according to DIN 53 543 ($a_k$)
Heat resistance according to DIN 53 460 (Vicat B softening point)
Fire test UL 94 of the Underwriters' Laboratories The results obtained are shown in Table 2.

TABLE 2

|  | $a_n$ kJ/m$^2$ | $a_k$ kJ/m$^2$ | Vicat B °C. | UL 94 1.6 mm bar |
| --- | --- | --- | --- | --- |
| Comparison 3.0 | u.b.* | 13 | 81 | no classification |
| Example 3.1 | u.b. | 11 | 88 | V-1 |
| Example 3.2 | u.b. | 7 | 89 | V-2 |
| Example 3.3 | u.b. | 5 | 86 | V-0 |
| Example 3.4 | u.b. | 4 | 96 | V-0 |
| Example 3.5 | u.b. | 7 | 94 | V-0 |
| Example 3.6 | u.b. | 3 | 103 | V-0 |
| Example 3.7 | u.b. | 6 | 89 | V-0 |
| Example 3.8 | u.b. | 7 | 90 | V-1 |

*unbroken

EXAMPLE 4

Constituents I to VI, IX, X and XIII are mixed in the quantities (parts by weight) shown in Table 3 at 230° to 240° C. in the same internal kneader as in Example 3.

The molding compounds are then injection molded to test specimens at 260° C. as in Example 3 and subjected to the same tests.

Table 4 shows the results obtained.

TABLE 3

|  | Component | | | | | | | | |
| --- | --- | --- | --- | --- | --- | --- | --- | --- | --- |
|  | I | II | III | IV | V | VI | IX | X | XIII |
| Example 4.1 | 60.0 | 19.5 | | 5.0 | 0.5 | 6.0 | 9.0 | | |
| Example 4.2 | 65.0 | 20.0 | | 3.0 | | 3.0 | 9.0 | | |
| Example 4.3 | 60.0 | 19.5 | | 5.0 | 0.5 | 3.0 | | 12.0 | |
| Example 4.4 | 60.0 | 11.0 | 5.0 | 5.0 | 1.0 | | 9.0 | | 9.0 |
| Example 4.5 | 60.0 | 19.5 | | 5.0 | 0.5 | | 7.5 | | 7.5 |
| Example 4.6 | 60.0 | 19.5 | | 5.0 | 0.5 | | | 7.5 | 7.5 |
| Example 4.7 | 60.0 | 19.5 | | 5.0 | 0.5 | 5.0 | 5.0 | | 5.0 |
| Example 4.8 | 60.0 | 19.5 | | 5.0 | 0.5 | | | 5.0 | 5.0 |
| Example 4.9 | 65.0 | 15.0 | | 5.0 | | 6.0 | 6.0 | 6.0 | 3.0 |

TABLE 4

|  | $a_n$ kJ/m$^2$ | $a_k$ kJ/m$^2$ | Vicat B °C. | UL 94 1.6 mm bar |
| --- | --- | --- | --- | --- |
| Example 4.1 | u.b. | 5 | 83 | V-0 |
| Example 4.2 | u.b. | 4 | 94 | V-0 |
| Example 4.3 | u.b. | 7 | 91 | V-0 |
| Example 4.4 | u.b. | 5 | 90 | V-1 |
| Example 4.5 | u.b. | 3 | 90 | V-0 |
| Example 4.6 | u.b. | 5 | 96 | V-0 |
| Example 4.7 | u.b. | 4 | 90 | V-0 |
| Example 4.8 | u.b. | 6 | 93 | V-0 |

TABLE 4-continued

|  | $a_n$ kJ/m$^2$ | $a_k$ kJ/m$^2$ | Vicat B °C. | UL 94 1.6 mm bar |
| --- | --- | --- | --- | --- |
| Example 4.9 | u.b. | 3 | 93 | V-0 |

Tables 1-4 of Examples 3 and 4 show that the phosphates according to the invention either individually, in admixture with triphenyl phosphate or with one another or in admixture with even less volatile phosphates provide blends of polycarbonate and ABS components in the presence of typical quantities of polytetrafluoroethylene with a flame resistance which is attributed the UL 94 rating of V-0 for a test specimen thickness of 1.6 mm.

In every case, the softening point is higher than that of the sample flameproofed with triphenyl phosphate which, with 60% polycarbonate and 15% triphenyl phosphate, fails the UL 94 fire test. The phosphates according to the invention are considerably less volatile than triphenyl phosphate.

What is claimed is:

1. This invention relates to thermoplastic molding compounds containing (A) 40 to 90 parts by weight of a thermoplastic aromatic polycarbonate, (B) 10 to 50 parts by weight of a thermoplastic copolymer of 50 to 95% by weight styrene, α-methyl styrene, nucleus-alkylated styrene, halostyrene or mixtures thereof and 5 to 50% by weight acrylonitrile, methacrylonitrile, alkyl acrylate, alkyl methacrylate, maleic anhydride, N-substituted maleic imide, vinyl acetate or mixtures thereof, (C) 0 to 25 parts by weight of a graft polymer produced from (C.1) 5 to 90 parts by weight of a mixture of:

(C1.1) 50 to 95% by weight styrene, α-methyl styrene, halostyrene, nucleus-alkylated styrene, methyl methacrylate or mixtures thereof and (C.1.2) 5 to 50% by weight (meth) acrylonitrile, methyl methacrylate, maleic anhydride, N-substituted maleic imide or mixtures thereof on (C.2) 10 to 95 parts by weight of a rubber having a glass temperature $T_G$ of $\leq 10°$ C., (D) 1 to 25 parts by weight of a phosphorus compound, based on 100 parts by weight of the mixture of (A)+(B) and, optionally, (C), (E) 0.05 to 5.0 parts by weight, based on 100 parts by weight (A)+(B) and, optionally, (C) of a tetrafluoroethylene polymer having mean particle sizes of 0.05 to 20 μm and a density of 1.2 to 1.9 g/m$^3$, characterized in that they contain as the phosphorus compounds (D) those corresponding to formula (I)

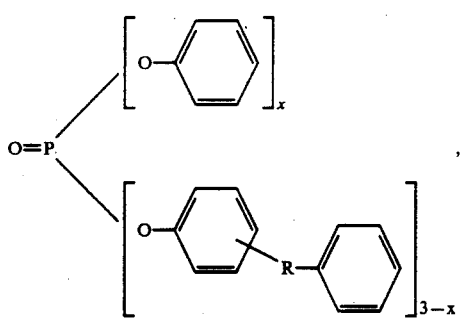
(I)

in which R is a direct bond, a —CH$_2$—,

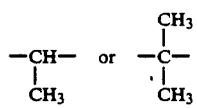

group and x=0, 1 or 2 and the aromatic parts may also be alkyl-substituted.

2. Molding compounds as claimed in claim 1, characterized in that component (D) is present in quantities of from 2 to 20 parts by weight.

3. Thermoplastic polycarbonate molding compounds as claimed in claim 1, characterized in that component (A) is a thermoplastic polycarbonate based on diphenols corresponding to formula (IV)

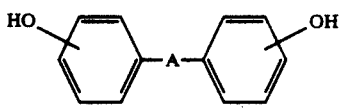
(IV)

and, optionally, to formula (IVa)

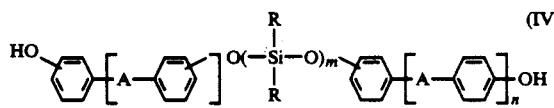
(IVa)

in which
A is a single bond, C$_1$-C$_5$ alkylene, a C$_2$-C$_5$ alkylidene, a C$_5$-C$_6$ cycloalkylidene, —O—, —S— or —SO$_2$—, the aromatic parts may be substituted by methyl groups or halogen atoms, n=1 or 0, the R's may be the same or different and represent a linear C$_1$-C$_{20}$ alkyl, branched C$_3$-C$_{20}$ alkyl or C$_6$-C$_{20}$ aryl, preferably CH$_3$, and n is a number 5 to 100, preferably from 20 to 80, the quantity by weight of diphenols corresponding to formula (IVa) in the copolycarbonates being gauged in such a way that the content of diorganosiloxy units (V)

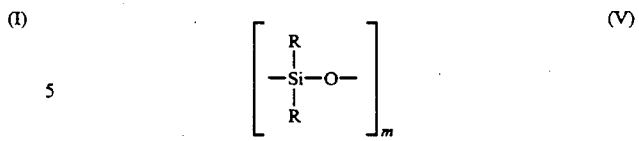
(V)

in polycarbonate (A) is between 1 and 25% by weight and preferably between 2.5 and 25% by weight.

4. Polycarbonate molding compounds as claimed in claim 1, characterized in that component (A) is a mixture of siloxane-containing polycarbonates and siloxane-free polycarbonates.

5. Molding compounds as claimed in claim 1, characterized in that component (E) is present in quantities of from 0.1 to 1.0 parts by weight.

6. Molding compounds as claimed in claim 1, characterized in that component (E) is used in the form of a coagulated mixture of emulsions of the tetrafluoroethylene polymers (E) with emulsions of the graft polymers (C), in which the ratio by weight of graft polymer (C) to the tetrafluoroethylene polymer (E) is from 95:5 to 60:40 and the content of coprecipitate of (C) and (E) is between 0.1 and 20.0 parts by weight to 100 parts by weight (A), (B) and, optionally, (C).

7. Molding compounds as claimed in claim 1, characterized in that (C) is prepared from
(C.1) 30 to 80 parts by weight of a mixture of (C.1.1) and (C.1.2) and
(C.2) 20 to 70 parts by weight.

8. Molding compounds as claimed in claim 1, additionally containing thermoplastic polyalkylene carboxylic acid esters, thermoplastic polysulfones, thermoplastic polyether sulfones, thermoplastic polyphenylene sulfides, stabilizers, pigments, flow aids, mold release agents, antistatic agents and/or other flameproofing agents.

9. Molding compounds as claimed in claim 8, characterized in that phosphoric acid esters of novolaks are used as the other flameproofing agent.

10. A process for the production of the polycarbonate molding compounds claimed in claim 1, characterized in that components (A), (B), (D), (E) and, optionally, (C), thermoplastic polyalkylene carboxylic acid esters, thermoplastic polysulfones, thermoplastic polyether sulfones, thermoplastic polyphenylene sulfides, stabilizers, pigments, flow aids, mold release agents, antistatic agents and/or other flameproofing agents are mixed in known manner and the resulting mixture is melt-compounded or melt-extruded in standard units at temperatures in the range from 200° to 330° C. or solutions of the particular constituents mentioned above in suitable organic solvents are mixed and the solution mixtures are concentrated by evaporation in standard units.

* * * * *